United States Patent
Markki et al.

(10) Patent No.: US 7,359,674 B2
(45) Date of Patent: Apr. 15, 2008

(54) CONTENT DISTRIBUTION & COMMUNICATION SYSTEM FOR ENHANCING SERVICE DISTRIBUTION IN SHORT RANGE RADIO ENVIRONMENT

(75) Inventors: Outi Markki, Espoo (FI); Jan-Erik Ekberg, Helsinki (FI); Heikki Kokkinenh, Helsinki (FI); Mika Kuoppala, Espoo (FI)

(73) Assignee: Nokia Corporation, Espoo (FI)

( * ) Notice: Subject to any disclaimer, the term of this patent is extended or adjusted under 35 U.S.C. 154(b) by 409 days.

(21) Appl. No.: 11/125,273

(22) Filed: May 10, 2005

(65) Prior Publication Data

US 2006/0258338 A1 Nov. 16, 2006

(51) Int. Cl.
*H04B 7/00* (2006.01)

(52) U.S. Cl. .......... 455/41.2; 455/414.4; 455/566; 455/556.2; 455/412.1; 455/466; 370/313; 370/338; 370/401; 709/202; 709/221; 709/250

(58) Field of Classification Search .......... 455/41.2, 455/556.2, 566, 414.1, 466, 414.4, 515; 709/219, 202, 203
See application file for complete search history.

(56) References Cited

U.S. PATENT DOCUMENTS

| | | | |
|---|---|---|---|
| 5,521,251 A | 5/1996 | Satoh et al. | |
| 5,819,039 A | 10/1998 | Morgaine | |
| 6,112,103 A | 8/2000 | Puthuff | |
| 6,198,941 B1 * | 3/2001 | Aho et al. | 455/552.1 |
| 6,219,696 B1 | 4/2001 | Wynblatt et al. | |
| 6,532,368 B1 | 3/2003 | Hild et al. | |
| 6,591,266 B1 | 7/2003 | Li et al. | |
| 6,601,093 B1 | 7/2003 | Peters | |
| 6,631,269 B1 * | 10/2003 | Cave | 455/450 |
| 6,633,757 B1 | 10/2003 | Hermann et al. | |
| 6,650,912 B2 * | 11/2003 | Chen et al. | 455/574 |
| 6,657,713 B2 | 12/2003 | Hansen | |
| 6,681,115 B1 * | 1/2004 | McKenna et al. | 455/517 |
| 6,738,373 B2 * | 5/2004 | Turner | 370/352 |
| 6,757,715 B1 | 6/2004 | Philyaw | |
| 6,765,474 B2 | 7/2004 | Eaton et al. | |
| 6,882,677 B2 * | 4/2005 | Dehner et al. | 375/132 |

(Continued)

FOREIGN PATENT DOCUMENTS

EP 1246487 A2 2/2002

(Continued)

OTHER PUBLICATIONS

European Search Report issued in corresponding Intl. Appln. No. PCT/IB2006/001247; 15 pgs. (Oct. 31, 2006).

(Continued)

*Primary Examiner*—Marceau Milord
(74) *Attorney, Agent, or Firm*—Morgan & Finnegan LLP

(57) ABSTRACT

A system for propagating information among wireless communication devices in an efficient manner. More specifically, the invention involves regulating the behavior of a wireless communication device (WCD) between a primarily passive mode where client or slave availability is maximized and a primarily active mode where information propagation or master behavior is maximized. The regulation of the WCD is controlled based on the environment surrounding the WCD, including the devices in effective transmission range of the device, and the current condition of the WCD.

37 Claims, 9 Drawing Sheets

U.S. PATENT DOCUMENTS

| | | | |
|---|---|---|---|
| 6,909,721 B2* | 6/2005 | Ekberg et al. | 370/401 |
| 6,981,210 B2 | 12/2005 | Peters et al. | |
| 7,028,032 B1 | 4/2006 | Diedrich et al. | |
| 7,095,748 B2* | 8/2006 | Vij et al. | 370/401 |
| 7,099,671 B2* | 8/2006 | Liang | 455/450 |
| 7,126,937 B2* | 10/2006 | Crosbie et al. | 370/350 |
| 7,158,176 B2* | 1/2007 | Tokkonen et al. | 348/231.99 |
| 7,158,756 B2* | 1/2007 | Palin et al. | 455/41.2 |
| 7,167,678 B2* | 1/2007 | Powers | 455/41.2 |
| 7,193,991 B2* | 3/2007 | Melpignano et al. | 370/352 |
| 7,218,644 B1* | 5/2007 | Heinonen et al. | 370/468 |
| 7,257,099 B2* | 8/2007 | Myojo | 370/329 |
| 7,263,345 B2* | 8/2007 | Kotola et al. | 455/403 |
| 7,266,389 B2* | 9/2007 | Karaoguz et al. | 455/556.1 |
| 2002/0012329 A1 | 1/2002 | Atkinson et al. | |
| 2002/0039367 A1 | 4/2002 | Seppala et al. | |
| 2002/0044549 A1 | 4/2002 | Johansson et al. | |
| 2002/0073204 A1 | 6/2002 | Dutta et al. | |
| 2002/0120750 A1 | 8/2002 | Nidd | |
| 2002/0123360 A1 | 9/2002 | Vikman et al. | |
| 2002/0124046 A1 | 9/2002 | Fischer et al. | |
| 2002/0129170 A1 | 9/2002 | Moore et al. | |
| 2002/0152299 A1 | 10/2002 | Traversat et al. | |
| 2002/0160758 A1 | 10/2002 | Pradhan et al. | |
| 2002/0160793 A1 | 10/2002 | Pradhan et al. | |
| 2002/0178215 A1 | 11/2002 | Lacksono et al. | |
| 2002/0188657 A1 | 12/2002 | Traversat et al. | |
| 2003/0013483 A1 | 1/2003 | Ausems et al. | |
| 2003/0037033 A1 | 2/2003 | Nyman et al. | |
| 2003/0041141 A1 | 2/2003 | Abdelaziz et al. | |
| 2003/0054806 A1 | 3/2003 | Ho et al. | |
| 2003/0061364 A1 | 3/2003 | Banerjee et al. | |
| 2003/0069016 A1 | 4/2003 | Bahl et al. | |
| 2003/0078062 A1 | 4/2003 | Burr | |
| 2003/0110218 A1 | 6/2003 | Stanley | |
| 2003/0115415 A1 | 6/2003 | Want et al. | |
| 2003/0131059 A1 | 7/2003 | Brown et al. | |
| 2003/0207683 A1 | 11/2003 | Lempio et al. | |
| 2003/0208522 A1 | 11/2003 | McDonnell et al. | |
| 2003/0228842 A1 | 12/2003 | Heinonen et al. | |
| 2004/0002385 A1 | 1/2004 | Nguyen | |
| 2004/0009750 A1 | 1/2004 | Beros et al. | |
| 2004/0015403 A1 | 1/2004 | Moskowitz et al. | |
| 2004/0030743 A1 | 2/2004 | Hugly et al. | |
| 2004/0043770 A1 | 3/2004 | Amit et al. | |
| 2004/0063498 A1 | 4/2004 | Oakes et al. | |
| 2004/0063980 A1 | 4/2004 | Raths et al. | |
| 2004/0064568 A1 | 4/2004 | Arora et al. | |
| 2004/0075675 A1 | 4/2004 | Raivisto et al. | |
| 2004/0085947 A1 | 5/2004 | Ekberg et al. | |
| 2004/0087274 A1 | 5/2004 | Ekberg et al. | |
| 2004/0114557 A1 | 6/2004 | Bryan et al. | |
| 2004/0171378 A1 | 9/2004 | Rautila | |
| 2004/0224706 A1 | 11/2004 | Lorello et al. | |
| 2004/0225712 A1 | 11/2004 | Tajima et al. | |
| 2005/0058108 A1 | 3/2005 | Ekberg et al. | |
| 2005/0058109 A1 | 3/2005 | Ekberg et al. | |
| 2005/0059376 A1 | 3/2005 | Sovio et al. | |
| 2005/0059379 A1 | 3/2005 | Sovio et al. | |
| 2005/0088980 A1 | 4/2005 | Olkkonen et al. | |
| 2005/0114756 A1 | 5/2005 | Lehikoinen et al. | |
| 2005/0185660 A1 | 8/2005 | Ekberg et al. | |
| 2005/0208892 A1 | 9/2005 | Kotola | |
| 2005/0239494 A1 | 10/2005 | Klassen et al. | |
| 2006/0058011 A1 | 3/2006 | Vanska et al. | |
| 2006/0199533 A1 | 9/2006 | Zilliacus et al. | |
| 2006/0268896 A1 | 11/2006 | Kotola et al. | |

FOREIGN PATENT DOCUMENTS

| | | |
|---|---|---|
| EP | 1 207 707 A1 | 5/2002 |
| EP | 1 242 986 B1 | 9/2002 |
| EP | 123540 A2 | 10/2002 |
| EP | 1246487 A2 | 10/2002 |
| EP | 1246487 A3 | 10/2002 |
| EP | 1392023 A2 | 2/2004 |
| EP | 1392023 A3 | 2/2004 |
| EP | 1392023 A3 | 6/2004 |
| EP | 1 505 811 A1 | 2/2005 |
| GB | 2410153 A | 7/2005 |
| JP | 2003/016347 A1 | 1/2003 |
| JP | 2003016347 | 1/2003 |
| WO | WO 99/41876 | 8/1999 |
| WO | WO 00/72506 A1 | 11/2000 |
| WO | WO 01/31960 | 5/2001 |
| WO | WO 01/45319 A1 | 6/2001 |
| WO | WO 01/95592 | 12/2001 |
| WO | WO 02/071285 | 9/2002 |
| WO | WO 03/034664 A1 | 4/2003 |
| WO | WO 03/055150 A2 | 7/2003 |
| WO | WO 03/055238 A1 | 7/2003 |
| WO | WO 2004/038541 A2 | 5/2004 |
| WO | WO 2004/091143 A2 | 10/2004 |
| WO | WO 2005/038696 | 4/2005 |
| WO | 2006092688 A2 | 9/2006 |
| WO | WO 2006/092688 A2 | 9/2006 |

OTHER PUBLICATIONS

"Assigned Numbers", article [online], Bluetooth SIG, Inc., 1999-2001 [2 pages retrieved on Sep. 3, 2003]. Retrieved from the Internet: <http://www.bluetoothsig.org/assigned-numbers/>.

"Assigned Numbers—Bluetooth Baseband", article [online], Bluetooth SIG., Inc. 1999-2001 [7 pages retrieved on Sep. 3, 2003]. Retrieved from the Internet <http://www.bluetoothsig.org/assigned-numbers/baseband.htm>.

"Assigned Numbers—Link Manager Protocol (LMP)", article [online], Bluetooth SIG, Inc. 1999-2001 [1 page retrieved on Sep. 3, 2003]. Retrieved from the Internet <http://www.bluetoothsig.org/assigned-numbers/lmp.htm>.

"Assigned Numbers—Logical Link Control and Adaptation Protocol (L2CAP)", article [online], Bluetooth SIG., Inc. 1999-2001 [2 pages retrieved on Sep. 3, 2003]. Retrieved from the Internet <http://www.bluetoothsig.org/assigned-numbers/l2cap.htm>.

"Assigned Numbers—Service Discovery Protocol (SDP)", article [online], Bluetooth SIG., Inc. 1999-2001 [11 pages retrieved on Sep. 3, 2003]. Retrieved from the Internet <http://www.bluetoothsig.org/assigned-numbers/sdp.htm>.

"Assigned Numbers—Service Discovery Protocol (SDP)", article [online], Bluetooth SIG., Inc. 1999-2001 [5 pages retrieved on Sep. 3, 2003]. Retrieved from the Internet <http://www.bluetoothsig.org/assigned-numbers/host.htm>.

"Assigned Numbers—Company Identifiers", article [online], Bluetooth SIG., Inc. 1999-2001 [3 pages retrieved on Sep. 3, 2003]. Retrieved from the Internet <http://www.bluetoothsig.org/assigned-numbers/company.htm>.

"Assigned Numbers—References", article [online], Bluetooth SIG., Inc. 1999-2001 [6 pages retrieved on Sep. 3, 2003]. Retrieved from the Internet <http://www.bluetoothsig.org/assigned-numbers/tail.htm>.

"All About ISOC", web page [online], Internet Society, 2002 [2 pages retrieved on Oct. 23, 2003]. Retrieved from the Internet: <http://www.isoc.org/isoc/>.

"All About ISOC: Conferences—NDSS", web page [online], Internet Society, 2002 [1 page retrieved on Oct. 23, 2003]. Retrieved from the Internet: <http://www.isoc.org/isoc/conferences/ndss/>.

"Internet Society (ISOC): All About The Internet", web page [online], Internet Society, 2002 [1 page retrieved on Oct. 23, 2003]. Retrieved from the Internet: <http://www.isoc.org/isoc/conferences/ndss/02/>.

"NDSS Conference Proceedings: 2002", web page [online], Internet Society [2 pages retrieved on Oct. 23, 2003]. Retrieved from the Internet: <http://www.isoc.org/isoc/conferences/ndss/02/proceedings/>.

Balfanz et al. "Talking to Strangers: Authentication in Ad-Hoc Wireless Networks", Xerox Palo Alto Research Center, (Date Unknown), 13 pages.

Kammer et al., "Bluetooth Application Developer's Guide: The Short Range Interconnect Solution", Syngress Publishing, Inc., 2002, pp. 1-68.

Bobba et al., Bootstrapping Security Associations for Routing in Mobile Ad-Hoc Workstations, IEEE Global Telecommunications Conference Proceedings; San Francisco, CA Dec. 1-5, 2003, IEEE Global Telecommunications Conference Proceedings, NY, NY: IEEE US, vol. 7 of 7; Dec. 1, 2003; pp. 1511-1513; GLOBCOM 2003; ISBN: 0-7803-7974-8.

"Windows NT Workstation"; Nov. 2, 2003; pp. 1-14; XP002323988; Retrieved from Internet: www.meetsoon.com/sid3.html; Apr. 11, 2005.

Kolsi et al.; "MIDP 2.0 Security Enhancements" System Sciences, 2004; Proceedings of the 37 Annual Hawaii International Conference on Jan. 5-8, 2004, Piscataway, NJ; IEEE, Jan. 5, 2004, pp. 287-294, XP010682881; ISBN: 0-7695-2056-1.

PCT International Search Report for PCT/Ib2006/001347, Oct. 24, 2006, 4 pages.

U.S. Appl. No. 10/801,598, filed Mar. 17, 2004, Kotola.

U.S. Appl. No. 11/067,764, filed Mar. 1, 2005, Zilliacus et al.

\* cited by examiner

CONTENT DISTRIBUTION & COMMUNICATION SYSTEM FOR ENHANCING SERVICE DISTRIBUTION IN SHORT RANGE RADIO ENVIRONMENT

RELATED CASES

This application is related to application Ser. No. 10/801,598, filed Mar. 17, 2004, entitled, "SYSTEM AND METHOD FOR REMOTE SERVICE INFORMATION"; application Ser. No. 11/067,754, filed Mar. 1, 2005, entitled, "METHOD AND SYSTEM FOR TACTILE CONFIRMATION OF SERVICE BOOKMARKS"; application Ser. No. 10/284,135, filed Oct. 31, 2002, entitled, "DEVICE DETECTION AND SERVICE DISCOVERY SYSTEM AND METHOD FOR A MOBILE AD HOC COMMUNICATIONS NETWORK"; application Ser. No. 10/662,407, filed Sep. 16, 2002, entitled, "DEVICE DETECTION AND SERVICE DISCOVERY SYSTEM AND METHOD FOR A MOBILE AD HOC COMMUNICATIONS NETWORK"; application Ser. No. 10/662,470, filed Sep. 16, 2003, entitled, "MECHANISM FOR IMPROVING CONNECTION CONTROL IN PEER-TO-PEER AD-HOC NETWORKS", assigned to Nokia Corporation.

BACKGROUND OF INVENTION

1. Field of Invention

The present invention relates to wireless communications. More particularly, the present invention relates to the management and propagation of service information transmitted by wireless communication devices using short-range communications.

2. Description of Prior Art

Wireless communication devices (WCD) continue to proliferate in the marketplace due to technological improvements in both the quality of the communications and the functionality of the devices. Devices such as cellular telephones have become commonplace for both personal and business use, allowing users to transmit and receive voice, text and graphical data from a multitude of geographical locations. The communication networks utilized by WCDs span different frequencies and cover different broadcast distances, each having strengths applicable to different communication applications.

Cellular networks facilitate WCD communications over large geographic areas. GSM, a widely employed cellular network which communicates in the 900 MHZ-1.8 GHZ band in Europe and at 1.9 GHZ in the United States, provides voice communication and supports the transmission of textual data via the Short Messaging Service (SMS). SMS allows a WCD to transmit and receive text messages of up to 160 characters. It also provides data transfer to packet networks, ISDN and POTS users at 9.6 Kbps. While cellular networks like GSM are a well-established means for transmitting and receiving data, due to cost, traffic and regulation concerns, a cellular network may not be appropriate for all data applications.

Short-range wireless networks provide communication solutions that avoid some of the problems seen in cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not have to actively instigate a network. Bluetooth™ instead has the ability to automatically establish an ad-hoc network constituted by a collection of wireless devices that are physically close enough to exchange information. This network group is called a "piconet". Any device may promote itself to the master of the piconet, allowing it to control data exchanges with up to seven "active" slaves and 255 "parked" slaves via their particular Parked Member Address (PM_ADDR). The master may also address any device in transmission range by using its Bluetooth™ Device Address (BD_ADDR), even if it is not a member of the previously indicated 255 devices. Active slaves exchange data based on the clock timing of the master. Parked slaves monitor a beacon signal in order to stay synchronized with the master.

The multitude of communication networks utilized by WCDs have created new opportunities for businesses to contact potential customers. Advertisers desire to use audio, text and graphical messages to promote goods and services directly to a consumer through a WCD. In order to control the rampant proliferation of advertising, often called "spamming" when referring to unsolicited email messages, many governments have implemented strict controls over how advertisers and information providers may use global cellular networks like GSM. For example, strict new laws are being passed in Korea where 5% of the 220 million cellular text messages sent daily are unsolicited advertisements. Many laws require opt-in for mobile marketing to prevent spam from getting to the consumer. For marketers, getting opt-in acceptance is a real problem. However, these regulatory problems currently do not exist for short-range networks.

Some services currently exist for marketers who desire to communicate information over short-range networks. The Nokia Local Marketing Solution is an information providing architecture for distributing data via short-range networks. A user who walks within transmission range of a fixed access point transmitting via short-range communications (e.g., Bluetooth™) has information automatically downloaded to a memory buffer in their WCD. The user must then open a "shortcut" browser to select from various temporarily stored informational "bookmarks". The selected bookmark is then permanently saved in the WCD, and in some cases, additional data relevant to the saved bookmark may then be retrieved via a cellular network. Unselected bookmarks are automatically deleted from the memory buffer when space is required to download new content.

ijack™ is a similar service provided by TeliaSonera Finland Oyj that provides graphical information to a user in effective range of a service point. The service point includes a Bluetooth™ broadcast device which may be totally wireless in that the service point may also be programmed (e.g., have broadcast content loaded) wirelessly using a GPRS cellular link to a business. The service point can then simultaneously broadcast information over a piconet containing up to seven Bluetooth™ enabled WCDs that have come within effective range of the service point. The user requires an iJack™ browser to view the information. After the browser is loaded, information is automatically downloaded to a WCD whenever the user comes into range of a service point. To save the data, the user must open the browser, find the information and manually trigger a download to the WCD.

While advertising over a short-range network may provide an innovative way for a business to reach a target consumer, communicating via this medium is not without its limitations. An ad-hoc network, (e.g., a piconet) is automatically, but not instantaneously, established. A WCD acting as a master must first inquire as to other devices in effective range in order to discover the target devices. Once potential network members are identified, the WCD must then negotiate with the devices to establish the connection (e.g., hop pattern, offset, etc.) and form the wireless network (e.g., distributing Active Member Addresses (AMA) and/or Parked Member Addresses (PMA)). The time to complete these tasks may be lengthened by electronic environmental noise, a plethora of wireless devices in transmit range, the modes or characteristics of the various wireless devices including content authorization requirements, etc. These limitations do not bode well in a commercial situation, where time is short because a potential customer may only spend moments in transmission range of an access point. In essence, there may not be enough time to distribute the information desired by potential customers coming within the transmission range of a fixed access point due to the time required to establish a connection and deliver the data, defeating the purpose of having an access point.

Solutions to the aforementioned problem are not readily apparent in the art. Technology exists to pass information from an origin to one device and then on to other devices, for example, to carry information via a mobile device from one source to a gateway or network for transmission to a desired destination. While these applications may propagate information from one device to another, the power required for sustained continuous distribution would quickly deplete the battery of a WCD. In a Bluetooth™ network, a group of devices doing continuous inquiries would experience a large amount of wireless traffic to the large number of active units trying to pass information simultaneously. This behavior would result in conflicts causing failed connections, and the inefficient draining of available resources. The device would have to include some sort of intelligence to allow it to switch modes based on it's surroundings, condition, etc. The prior art includes applications which allow a mobile WCD to change behavior depending on sensed conditions. However, none of these applications deal specifically with the propagation of service information in an efficient manner.

What is needed is a method and apparatus for propagating wireless information in a resource efficient manner that takes into consideration the devices within transmission distance, the characteristics of the device, and the information to be distributed so that the transmission may take place in an efficient manner.

SUMMARY OF INVENTION

The present invention includes a method, apparatus, program and system for propagating information among wireless communication devices in an efficient manner. More specifically, the invention involves regulating the behavior of a wireless communication device between a primarily passive mode where client or slave availability is maximized and a primarily active mode where information propagation or master behavior is maximized. The regulation of the WCD is controlled based on the environment surrounding the WCD, including the devices in effective transmission range of the device, and the current condition of the WCD.

In a first example of the invention, a WCD senses when it is in close proximity to a wireless access point. The device switches to a mode that primarily facilitates client connection with the access point. Assisted by the increased probability of connection, the access point may quickly establish a network including the WCD via short-range communication and download service information which is then stored on the device.

After the WCD disconnects from the access point, the behavior changes to a primarily active mode controlled to some extent by parameters included in the service information. In this second application of the invention, the WCD seeks out other devices in close proximity (e.g., within effective transmission range) and forms ad-hoc networks with these devices. The WCD then transmits at least some of the service information to the other members of the network, and then disconnects from these devices in order to establish connections with newly discovered units.

The WCD monitors different aspects of its own functioning and of its surrounding environment in order to determine appropriate behavior. In a third example, the WCD monitors various parameters related to the information propagation instructions it received as part of the service information from the access point. When a threshold level is exceeded, the WCD switches to a more neutral or intermediate mode to facilitate both connections from other devices while still establishing its own network connections as a master device.

Other aspects of the invention include monitoring environmental and device performance parameters to influence where on the spectrum from passive reception to active communication the wireless communication device operates. These factors may include lists provided by an access point of specific objectives to obtain, information obtained from other wireless communication devices describing specific content permitted to be downloaded, various power and or financial parameters of the wireless communication device, etc.

DESCRIPTION OF DRAWINGS

The invention will be further understood from the following detailed description of a preferred embodiment, taken in conjunction with appended drawings, in which.

DESCRIPTION OF PREFERRED EMBODIMENT

While the invention has been described in preferred embodiments, various changes can be made therein without departing from the spirit and scope of the invention, as described in the appended claims.

I. Operational Environment

Figure 1:
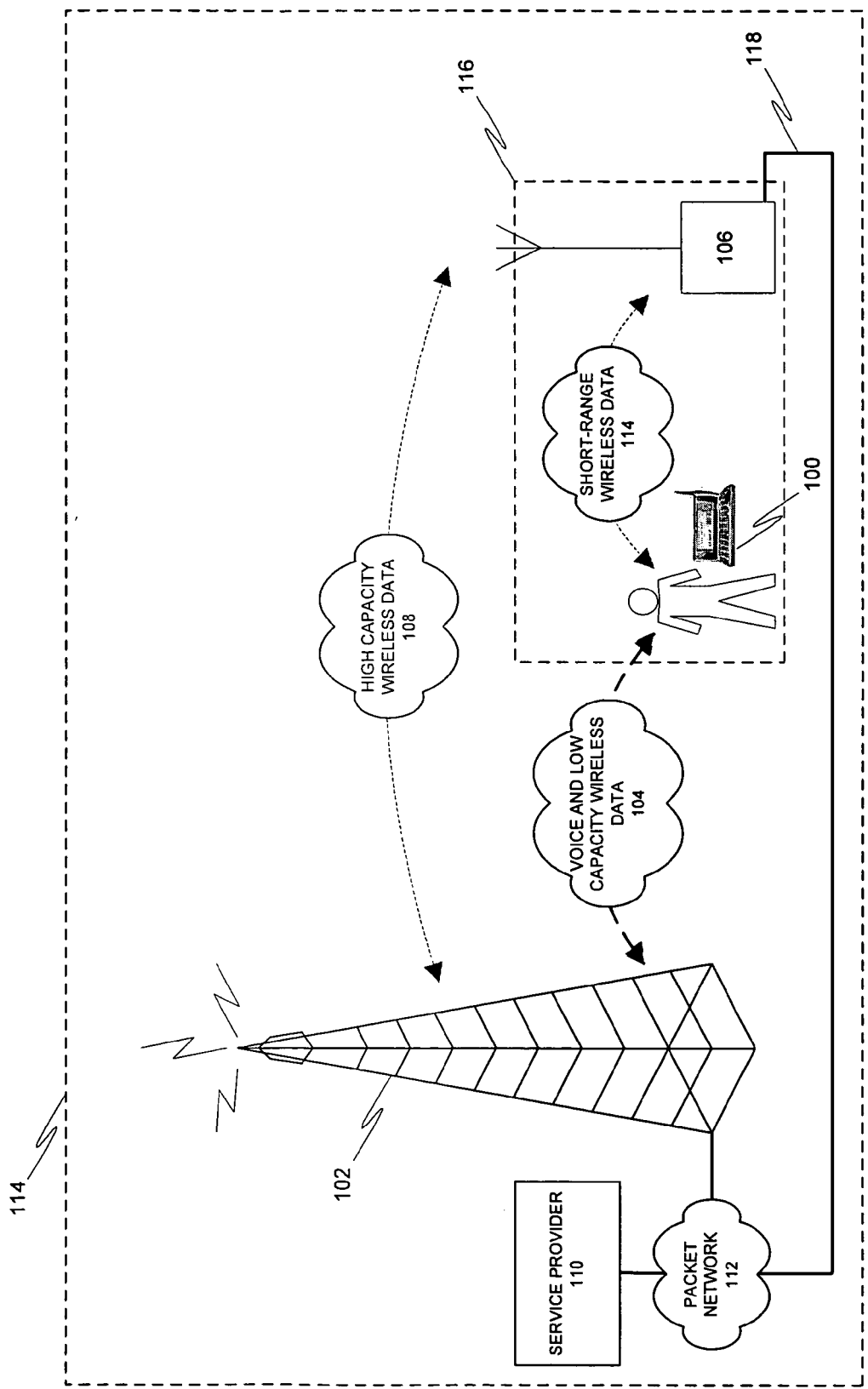
FIG. 1 is a representation of typical wireless communication networks and how these networks interact with a user having a wireless communication device.

Before describing the invention in detail, it may be helpful to describe an environment in which the invention may be used. Accordingly, FIG. 1 is a diagram of an exemplary operational environment in which WCD 100 may collect and consume services according to techniques of the present invention.

WCD 100 is capable of engaging in various types of wireless communications. For instance, WCD 100 may engage in short-range communications 114, as well as long range cellular communications 104 (e.g., GSM). Examples of short-range communications are not limited to Bluetooth™, WLAN (i.e., IEEE 802.11), ultra wideband (UWB) and/or wireless USB transmission. As shown in FIG. 1, WCD 100 may enter within communications range of an access point 106. This communications range is defined by a coverage area 116, which determines the extent of the range at which these devices may communicate.

When WCD 100 is within coverage area 116 of access point 106, it may enter into a short-range communications connection with access point 106. Once this connection is established, access point 106 may provide information to WCD 100 regarding various available services. This information may include one or more links or shortcuts to such services. These links may be transmitted to WCD 100 in an arrangement or data structure that is referred to herein as a service bookmark.

WCD 100 is also capable of communicating by employing short-range scanning of a target object containing machine-readable data. For instance, RFID communications can be used to scan a target object located within, or in proximity to, an access point 106. For such communications, the target object may include a transponder, which provides data to WCD 100 in response to a scan performed by WCD 100. Such communications may occur at a very close proximity to the target object (e.g., almost touching). Accordingly, for RFID communications, coverage area 116 may span a few feet.

Various service providers 110 provide these services. In the environment of FIG. 1, WCD 100 communicates with service providers 110 across a backbone network 114. FIG. 1 shows that backbone network 114 includes a packet-based network 112 (e.g., the Internet) and a cellular network 102. Cellular network 102 may include base stations and a mobile switching center. However, these implementations are provided for purposes of illustration, In fact, other network types and arrangements are within the scope of the present invention.

Backbone network 114 is also used for the accumulation of links by access points 106. For instance, each service provider 110 may transmit information regarding its services to access point 106 via a high capacity wireless data network 108. Non-limiting examples of high capacity wireless data networks include unidirectional broadcast networks such as Digital Video Broadcast (DVB) used alone, or in combination with, a cellular network employing for example GPRS communication. Alternatively, an access point 106 may be connected to the packet network 112 via hardwire network connection 118. The information transmitted from the service provider may include data (e.g., service bookmarks) to be collected by WCD 100. In addition, backbone network 114 may be used by WCD 100 to obtain further data from service providers 110 related to bookmark information received from access point 106.

II. Wireless Communication Device

Figure 2:
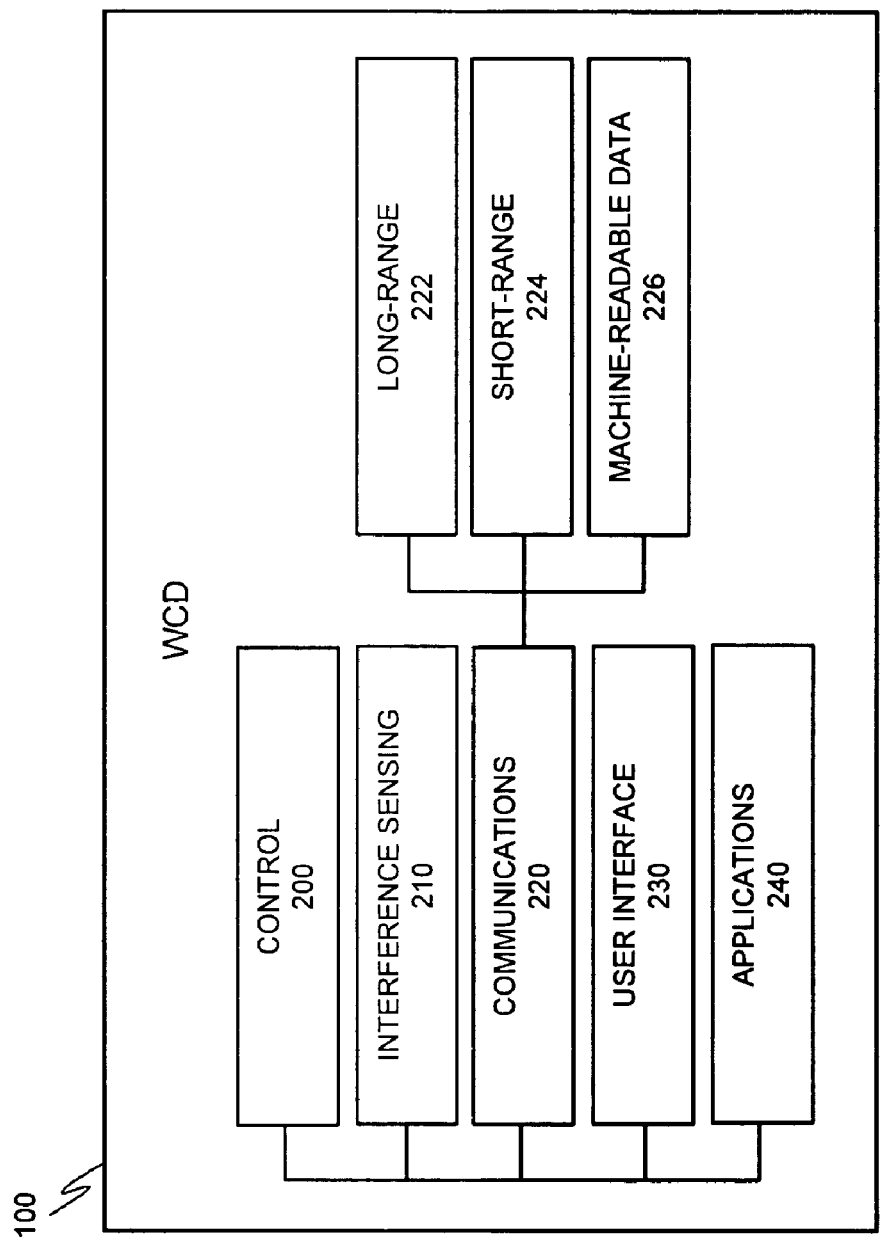
FIG. 2 is a modular representation of a wireless communication device usable in accordance with at least one embodiment of the present invention.

An exemplary modular layout for the wireless communication device is shown in FIG. 2. WCD 100 is broken down into modules representing the functional aspects of the device. These functions may be performed by various combinations of software and/or hardware components discussed below.

Control module 200 regulates the operation of the device. Inputs may be received from various other modules included within WCD 100. For example, interference sensing module 210 may use various techniques known in the art to sense sources of environmental interference within the effective transmission range of the wireless communication device. Control module 200 interprets these data inputs and in response may issue control commands to the other modules in WCD 100.

Communications module 220 incorporates all of the communications aspects of WCD 100. As shown in FIG. 2, communications module 220 includes at least long-range communications module 222, short-range communications module 224 and machine-readable data module 226. Communications module 220 utilizes at least these sub-modules to receive a multitude of different types of communication from both local and long distance sources, and to transmit data to recipient devices within broadcast range of WCD 100. Communications module 220 may be triggered by control module 200 or by local control resources responding to sensed messages, environmental influences and/or other devices in proximity to WCD 100.

User interface module 230 includes visual, audible and tactile elements which allow the user of WCD 100 to receive data from, and enter data into, the device. The data entered by the user may be interpreted by control module 200 to affect the behavior of WCD 100. User inputted data may also by transmitted by communications module 220 to other devices within effective transmission range. Other devices in transmission range may also send information to WCD 100 via communications module 220, and control module 200 may cause this information to be transferred to user interface module 230 for presentment to the user.

Applications module 240 incorporates all other hardware and/or software applications on WCD 100. These applications may include sensors, interfaces, utilities, interpreters, data applications, etc., and be invoked by control module 200 to draw from information provided by the various modules and in turn supply information to requesting modules in WCD 100.

Figure 3:
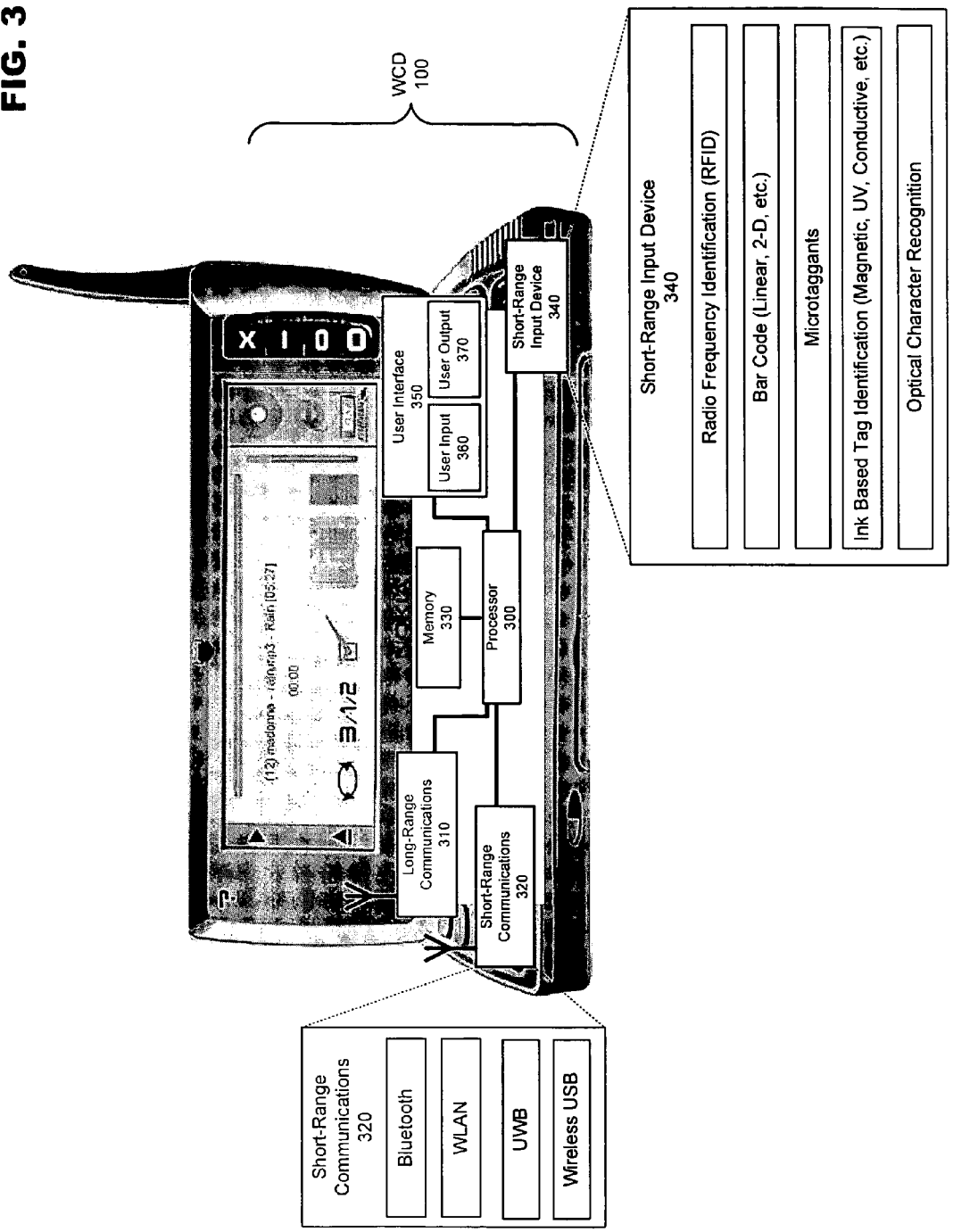
FIG. 3 is a functional representation of a wireless communication device usable in accordance with at least one embodiment of the present invention.

FIG. 3 discloses an exemplary functional layout of WCD 100, which may be used to implement the modular system previously described. Processor 300 controls overall device operation. As shown in FIG. 3, processor 300 is coupled to communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information across large coverage area networks (such as cellular networks) via an antenna. Therefore, long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data. For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to linear and 2-D bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include optical detectors, magnetic detectors, CCDs or other sensors known in the art for interpreting machine-readable information.

Further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, Light emitting diodes (LED), tactile emitters and one or more audio speakers. Exemplary displays include liquid crystal displays (LCDs), and other video displays.

Hardware corresponding to communications sections 310, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310 and 320, memory 330, short-range input device 340, user interface 350, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to protocols, such as the Wireless Application Protocol (WAP).

When engaging in WAP communications with a remote server, the device functions as a WAP client. To provide this functionality, the software components may include WAP client software components, such as a Wireless Markup Language (WML) Browser, a WMLScript engine, a Push Subsystem, and a Wireless Protocol Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

III. Operation of the Present Invention.

Figure 4:
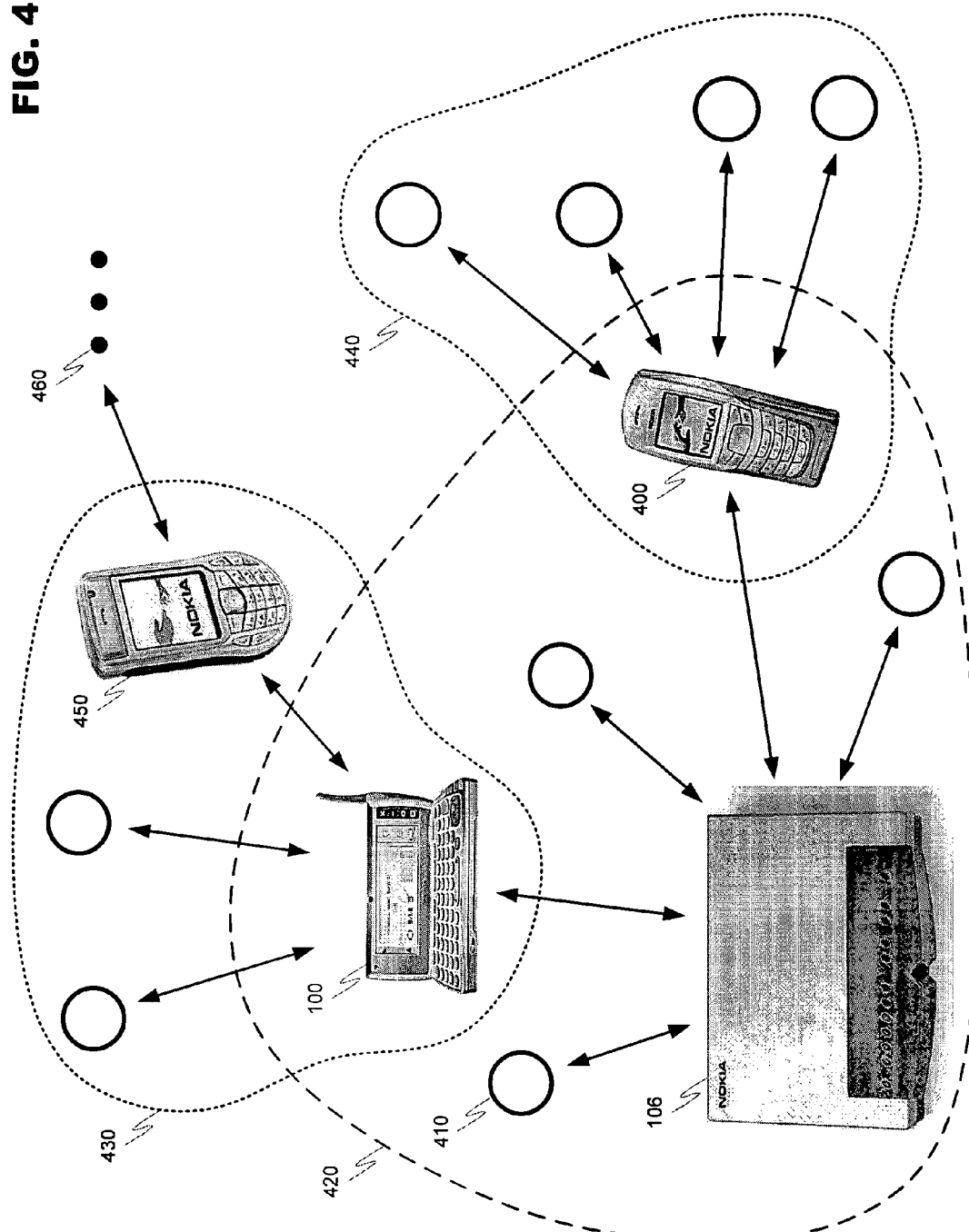
FIG. 4 is a representation of the propagation of information in accordance with at least one embodiment of the present invention.

FIG. 4 describes an exemplary operating environment of the present invention. Access point 106 includes content to be distributed to various wireless communication devices 410 within effective broadcast area 420. The content includes service information that may be related to commercial topics such as retail store information, sales information, electronic coupons, coming event information including event times, etc. Access point 106 will attempt to establish a connection, and in the case of Bluetooth™, will attempt to form a piconet with any Bluetooth™ enabled devices 410 in the area 420.

WCD 100 and WCD 400 are two devices capable of communicating via short-range communication such as Bluetooth™ within effective broadcast area 420 of access point 106. These devices are candidates to be members of a network initiated by access point 106. During this transaction, access point 106 will first issue an inquiry message to determine the potential network members in the area 420. The response to the inquiry message that contains the global addresses of all the compatible radios in the area. In order to form a network, access point 106 will then perform a page operation to all the potential network members based on their global address.

The success of the network-forming operation may depend on the characteristics of the targeted WCD. Often the user has the ability to disable the short-range communication resources of the device. The deactivation of these communication features is certain to prevent unwanted messages from being downloaded such as spam, viruses, etc. Otherwise, the WCD may have a firewall or filter that will only allow certain information providers to establish a short-range connection for data delivery. It may also be possible for a user to filter downloads based on the category of information in order to make sure that only certain informational topics are received via short-range communication. Alternatively, the user may be running some type of short-range instant messaging service or multi-player gaming interface that is constantly seeking to connect to other devices. This sort of application may create conflicts and result in failed connections by an access point.

If the access point 106 is authorized to establish a connection with any one of the WCD 100 and WCD 400, a network is formed and service information is transferred to each participating WCD. In addition to the main content, the service information may include propagation instructions that determine how the WCD should propagate or "push" the information out to other devices. Propagation instructions may include, but are not limited to, a time limit for propagation, a number of receiving devices limit, a category identification, a target device list, or any other information directing a WCD in how to handle the service information. In at least one embodiment of the invention, the WCD may reconnect with access point 106 at a later time and report its status in relation to the tasks requested in the propagation instructions. The information reported may include the number of devices to which the information was pushed, the identification of the devices to which the information was pushed, the activity time and/or date of information propagation, etc.

FIG. 4 further shows WCD 100 forming a subsequent connection to various wireless communications devices 410 including WCD 450. The propagation instructions may indicate that WCD 450 is an appropriate device to receive information, and WCD 450 has authorized the device to establish a connection and the content to be downloaded. Once WCD 450 has received the service information including propagation instructions, it can then pass information on to another device and so on (shown at 460).

The previous scenario presents an ideal situation. An access point feeds the propagation, and the various wireless communication devices carry the information outward. An access point may be hardwired to a power source, and therefore may transmit without consideration of energy level. However, the battery power for a WCD that continually tries to connect to every device in proximity will quickly become depleted. Of course, this would also render the other primary communication functions of the WCD useless to the user.

Figure 5:
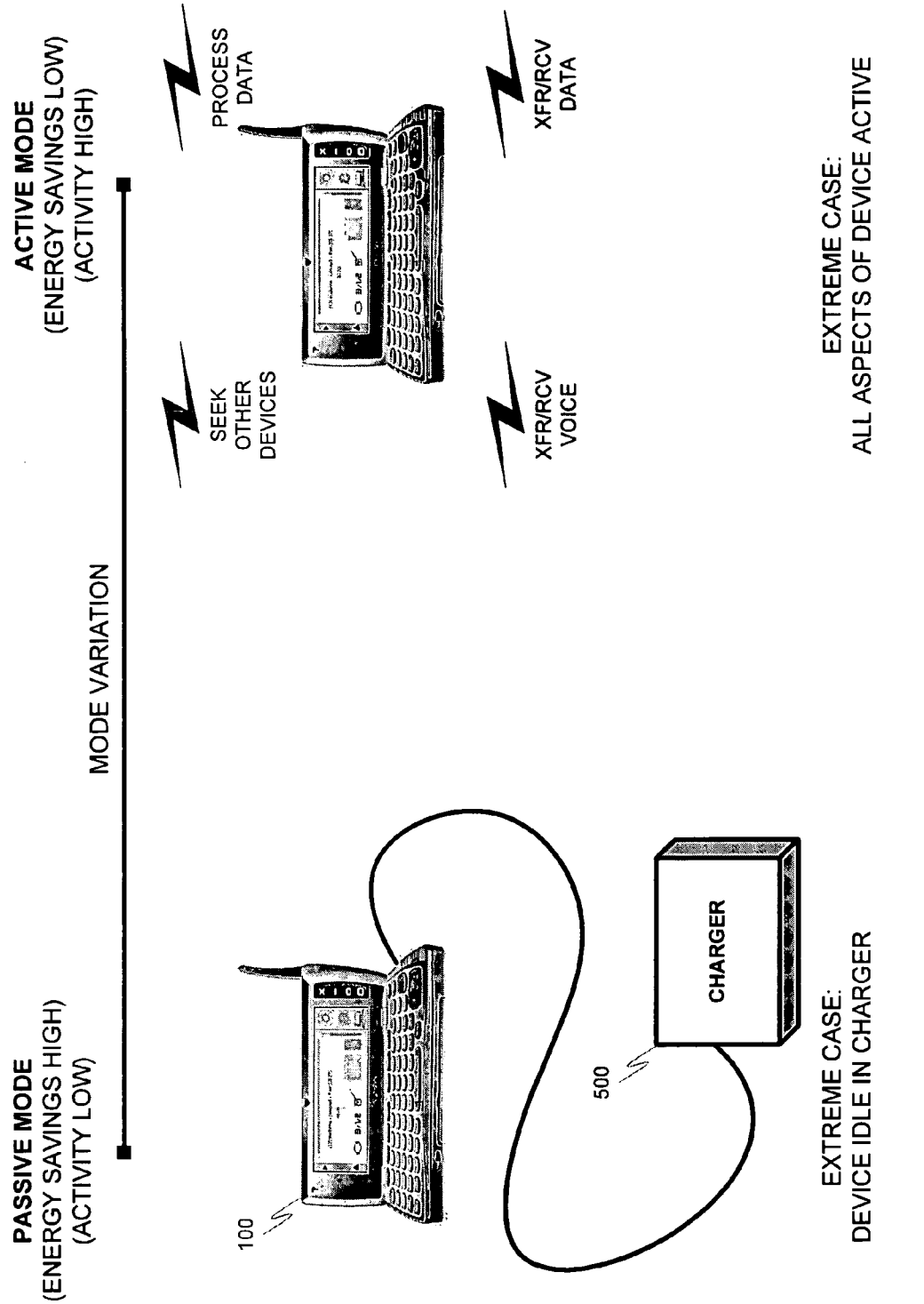
FIG. 5 is a representation of the full spectrum of modes in which a wireless communication device may operate in accordance with at least one embodiment of the present invention.

The spectrum of activity vs. energy usage is shown in FIG. 5. Passive mode is a condition where the activity of the device, in this case WCD 100, is low rendering the energy savings high. The most extreme example of this behavior is an unused device connected to a battery charger. FIG. 5 shows WCD 100 connected to battery charger 500. There is no activity, and hence no power drain. Power is also not a concern since the device is connected to an external power source. The other extreme is also disclosed in FIG. 5. In the most extreme example of active mode operation, all aspects of the device are employed simultaneously. The device may be transferring/receiving voice and data information, processing incoming data in order to affect the behavior of the device, seeking to connect to and other devices, etc., all while operating on internal power. In this mode the activity of the device is high, but stored energy will quickly be depleted.

On a regular basis, the present invention modifies the behavior of a wireless communication device within this spectrum in order to propagate information in a manner cognizant of the current condition the device. The current condition of the WCD is evaluated in view of environment of the WCD, including other close proximity devices, and various parameters related to the condition of the device.

Figure 6:
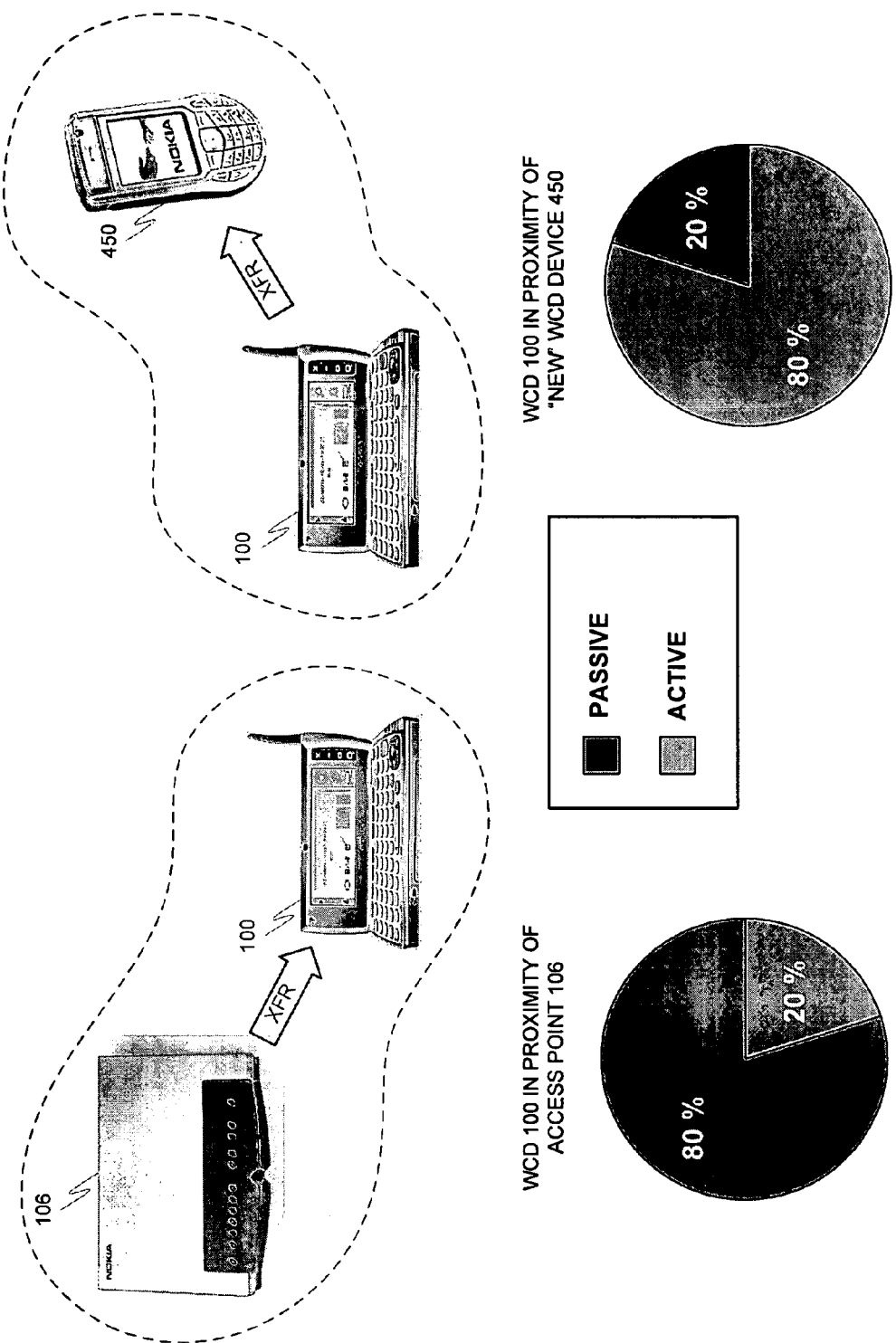
FIG. 6 is an exemplary representation of various information transactions and how these transactions fall within the spectrum of modes in which a wireless communication device may operate in accordance with at least one embodiment of the present invention.

FIG. 6 discloses an example of two WCD behavioral modes. The first case includes WCD 100 being in close proximity to access point 106. The identity of access point 106 may be discovered in various ways. For example, if access point 106 communicates via Bluetooth™, the global address or Class of Device (COD) may be used to identify the access point. The COD may indicate the type and ability of a device by using various bits to indicate a major device and minor device class. For example, the COD may be used to indicate an access point as the major class and the percent loading of the access point in the minor class. Alternatively, another form of short-range communication may be used. Machine-readable data may be read using the short-range input device 340, for instance via RFID communication, in order to identify an access point. After the access point is identified, the WCD 100 determines a mode change is necessary to a primarily passive mode. In this example embodiment, the WCD 100 changes behavior so that only 20% of the resources are actively employed in connecting to other wireless communication devices. The remaining 80% of the resources are devoted to making the device available as a potential member of a wireless network (e.g., a piconet) where access point 106 is the master. Therefore, the probability is higher that WCD 100 will receive service information from access point 106 in a short amount of time, while simultaneously conserving power.

In the second example embodiment presented in FIG. 6, WCD 100 has left the proximity of access point 106 and now is seeking to transmit data to other devices. Upon sensing the absence of the access point 106, the device converts to a primarily active mode. Now 80% of the device resources are devoted to seeking out and forming wireless networks with newly encountered devices, and the remaining 20% of the resources are devoted to the passive reception mode. This facilitates the active propagation of information originating at access point 106, through WCD 100 and out to other devices such as WCD 450.

Figure 7:
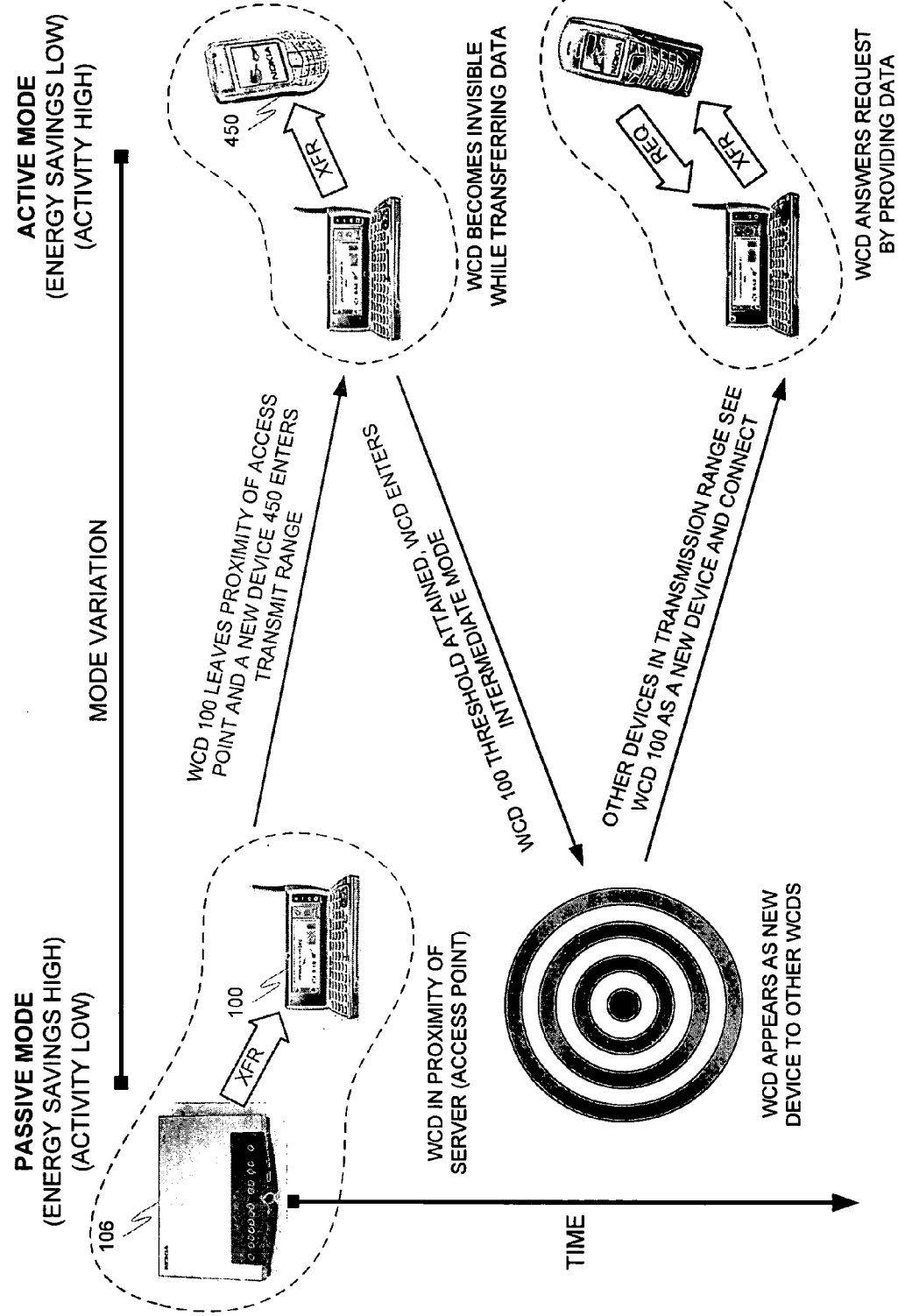
FIG. 7 is an exemplary representation of the propagation of information and how these transactions fall within the spectrum of modes in which a wireless communication device may operate in accordance with at least one embodiment of the present invention.

The previously explained rudimentary behavioral control forms the basis of the more complex system of the present invention. FIG. 7 discloses a more detailed example of the propagation of service information. At the start of the process, WCD 100 senses access point 106 in close proximity. If the access point contains content that is permitted by the user (e.g., the information is authorized to be downloaded by a firewall and/or filter in WCD 100), the device may change to a primarily passive mode. The WCD 100 may not make this mode change if the access point 106 does not have information to propagate, for example if it simply provides Internet access to wireless users. The WCD 100 also may consider other factors, such as remaining battery power, before entering a primarily passive mode. In this mode, WCD 100 is more susceptible to being included into a piconet where access point 106 is the master because there is a reduced probability that access point 106 will experience a communication conflict with WCD 100. After a connection is established, a piconet is formed and access point 106 may transmit service information to WCD 100. This exchange may happen where a user (e.g., a customer strolling through a shopping mall) browses through merchandise at a shop. When the user leaves the premises, WCD 100 also leaves the effective broadcast range of access point 106.

WCD 100 can no longer detect then presence access point 106, which indicates the need for a mode change. According to an embodiment of the present invention, WCD 100 moves to a primarily active mode and begins to seek out other wireless devices. (e.g. WCD 100 may spend 80% of its resources seeking out and forming wireless networks with newly encountered devices as presented previously in connection with FIG. 6.) When a new device comes into range (e.g., WCD 450), WCD 100 pages the device and attempts to form a short-range network. WCD 450 will receive the information from WCD 100 if the device/information is authorized by the WCD 450.

WCD 100 continues to operate in an active mode until it reaches a threshold limit. The threshold limit may include, but is not limited to, a number of information pushes to other devices, a number of new devices in range of WCD 100, number of requests to connect to other piconets, time period since WCD 100 was in proximity of the service point, current power level of WCD 100, current location of the WCD, etc. WCD 100 may then alter its behavior to an intermediate mode, wherein approximately 50% of the resources are applied to seeking out and forming wireless networks with newly encountered devices for allowing both connections to and from the device. The intermediate mode may act in accordance with other sensed factors, such as the remaining power available on WCD 100.

In at least one embodiment of the invention, WCD 100 may discourage other wireless communication devices from attempting to actively connect to it by becoming "invisible" to the inquiry messages of these other devices when operating in a primarily active mode. This behavior may also be used to subsequently "invite" connections from other devices because WCD 100 would "reappear" as a new device in the effective broadcast area when it reenters a passive or intermediate mode. Other primarily active devices operating under the same algorithm would attempt to connect to the newly discovered WCD 100 in order to form a short-range network. In this way, information may be propagated even though WCD 100 is no longer in an active mode, which saves power for the device.

Figure 8:
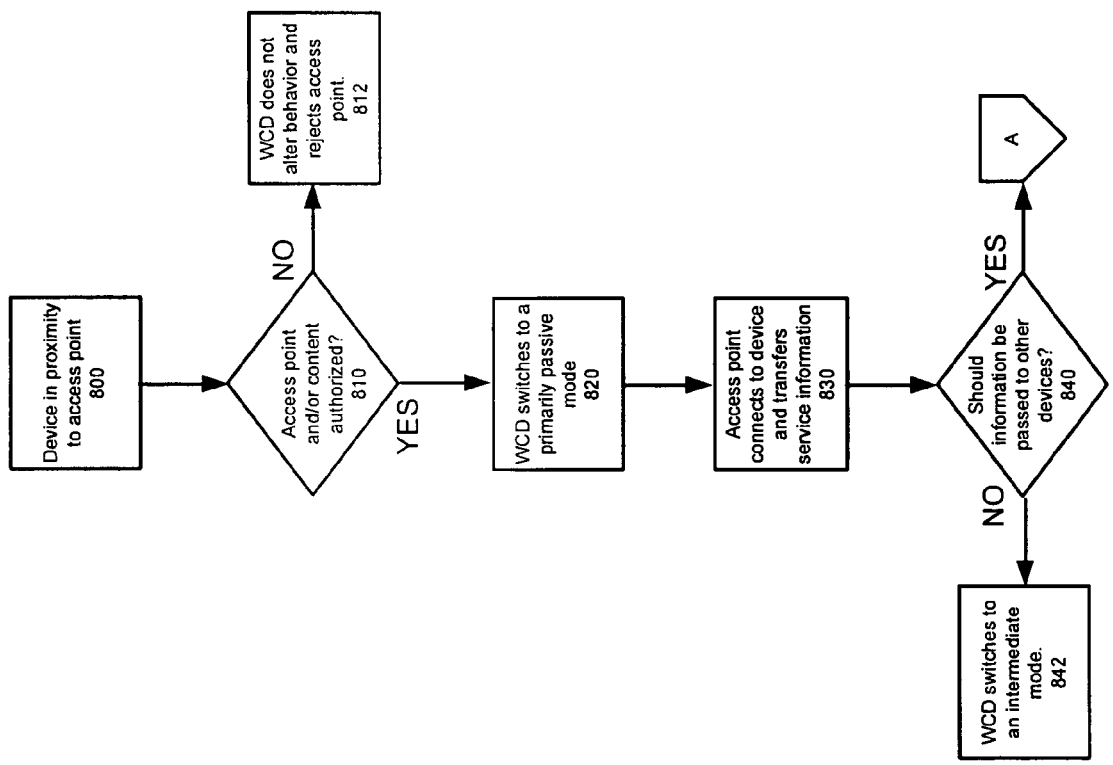
FIG. 8 is a flow chart describing the steps involved in the propagation of information from an access point to a wireless communication device in accordance with at least one embodiment of the present invention.

FIG. 8 is a flow chart describing the process of at least one embodiment of the present invention. In step 800, a WCD comes into proximity of a wireless access point. The WCD initially determines whether the access point/content are authorized to connect to and download to the WCD (step 810). If the user has decided that the access point/content is not permitted, then per step 812 the WCD does not change mode and any connection attempt from the access point is rejected. Otherwise the process continues to step 820.

Figure 9:
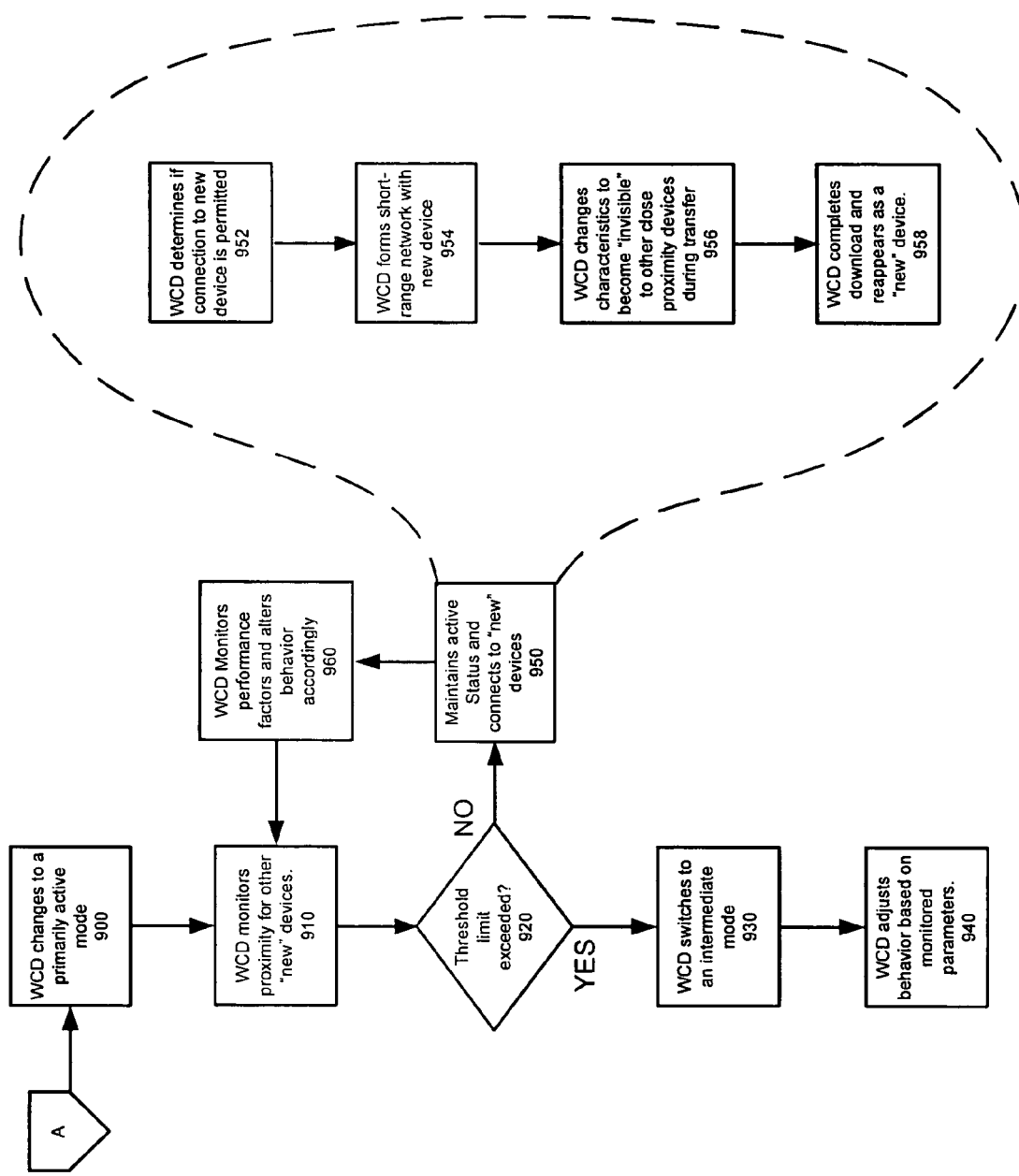
FIG. 9 is a flow chart describing the steps involved in the propagation of information from a wireless communication device to other discovered wireless communication devices in accordance with at least one embodiment of the present invention.

In step 820, the WCD switches to a primarily passive mode to facilitate a connection from the access point. The WCD may consider factors pertaining to the access point (e.g., whether it is a wireless local marketing access point containing information to propagate) or internal factors (e.g., remaining battery power) before executing the mode change. In this mode, the access point has an increased likelihood of paging the WCD into a piconet. Once the connection is made and the network established, the access point proceeds to download service information to the WCD (step 830). The service information includes both core content information and instructions related to the propagation of the core content information. The propagation instructions may include direction on what information to pass to other devices, which or what type of devices should receive the information, how many newly discovered devices should receive the information, and temporal and/or location-related thresholds. The WCD evaluates these instructions in step 840 to determine whether it is able to propagate the information. If the WCD cannot comply with the instructions, it returns to an intermediate functional mode which is the standard mode of operation (step 842). If the device is able to propagate the information in compliance with the propagation instructions, it proceeds to step 900 disclosed in FIG. 9.

In step 900 the WCD enters a primarily active mode. Most of the device's resources are then devoted to seeking out "new" devices (e.g., short-range communication enabled devices that have recently appeared in a response to an inquiry message) and disseminating information to these devices (step 910). Step 920 questions whether the active mode WCD has reached a limit or threshold. If the device has achieved the threshold, in step 930 the WCD changes modes to an intermediate mode that is at least partially regulated by performance parameters monitored by the WCD. If power is low, then the WCD may become more passive in order to save energy. Otherwise, it may operate in a more balanced operating mode (step 940) both seeking out, and receiving communications from, other devices. In the event that the threshold has not been reached, the WCD will remain in active mode and will continue to try and propagate information to new devices (step 950).

The process of the service information propagation from the WCD to other newly discovered devices is detailed in steps 952-958. Initially, the active WCD determines whether a new connection is permitted with the newly discovered device. This determination includes verifying whether the WCD and/or the content to be transmitted to the new device will be allowed. If connection is authorized, then in step 954 the WCD may form a short-range network with the new device and transmit the service information. During this transfer, the WCD may become "invisible" to inquiry commands from other devices within transmission range as illustrated in step 956. After downloading is complete the WCD discontinues the short-range network, allowing the device to "reappear" and respond to the inquiry commands of other devices. As a new device in the transmit area, the WCD will be a target for other devices which may communicate with it in order to exchange information, thereby propagating the original service information to other devices without having to expend the energy to actively search out and connect to other devices (step 958). During these alternating phases the WCD remains in a primarily active mode through these steps and will continue to try to connect to devices if it is not already engaged in a network. WCD monitors its critical parameters in step 960, allowing it to adjust the behavioral characteristics of the device in accordance with the monitored parameters. The parameters monitored are not limited to battery level, time in various states (passive, active, intermediate), call time (duration), financial parameters, etc.

The present invention is an improvement over the state of the art because it allows for the propagation of information from a fixed point without overtaxing the resources of a "courier" device. Fixed access points are limited because the target clients are only in proximity of their locations for a limited time. Through the improvements of the present invention, service information may be conveyed from device to device using a strategy that maximizes distribution while minimizing the resources spent. At least one embodiment of the present invention includes monitoring the resources of a wireless communication device to further adjust the behavior of the device to facilitate the goals of both the propagation of information and the preservation of resources.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

The invention claimed is:

1. A method, comprising:
   detecting the presence of an access point by a wireless communication device;
   establishing a connection with the access point via wireless short-range communication in order to receive service information;
   storing the service information in the wireless communication device prior to disconnecting from the access point;
   transmitting at least part of the service information from the wireless communication device to other discovered wireless communication devices via wireless short-range communication; and
   changing the operation mode of the wireless communication device to an intermediate mode upon determining that a threshold condition is exceeded.

2. The method of claim 1, wherein short-range communication is at least one of a Bluetooth™ network, a Wireless Local Area Network (WLAN), an Ultra Wide Band Network (UWB), or a Wireless Universal Serial Bus Network (WUSB).

3. The method of claim 1, wherein the presence of an access point is detected via machine-readable information including at least Radio Frequency Identification (RFID).

4. The method of claim 1, which further comprises:
   changing the operation mode of the wireless communication device to a primarily passive mode in response to the detection.

5. The method of claim 4, wherein the primarily passive mode comprises:
   decreasing the wireless communication device activity in discovering other wireless short-range communication devices; and
   increasing the wireless communication device activity in listening to wireless short-range communication connection attempts.

6. The method of claim 1, which further comprises:
   changing the operation mode of the wireless communication device to a primarily active mode in response to the disconnection.

7. The method of claim 6, wherein the primarily active mode comprises:
   increasing the wireless communication device activity in discovering other wireless short-range communication devices; and
   decreasing the wireless communication device activity in listening to wireless short-range communication connection attempts.

8. The method of claim 1, wherein the intermediate mode comprises:
   balancing the wireless communication device activity relating to discovering other wireless short-range communication devices and listening to wireless short-range communication connection attempts in view of device parameters.

9. The method of claim 8, wherein device parameters include at least one of a battery power level, a use time, a financial measure and a number of connections.

10. The method of claim 1, wherein the receiving and storing of service information occurs only if the information is authorized by the wireless communication device.

11. The method of claim 1, wherein the transmitting of service information occurs only if the information is authorized by the other discovered wireless communication device.

12. The method of claim 1, wherein the threshold level includes at least one of a number of information pushes to other devices, a number of other discovered wireless communication devices, a number of connection requests from other discovered wireless devices, a time period since the wireless communication device was in proximity of the access point and a current battery power level.

13. A wireless communication device comprising:
   detecting logic for detecting the presence of an access point by the wireless communication device;
   receiving logic coupled to the detecting logic for establishing a connection with the access point via wireless short-range communication in order to receive service information;
   a memory coupled to the receiving logic for storing the service information in the wireless communication device prior to disconnecting from the access point;
   transmitting logic coupled to the memory for transmitting at least part of the service information from the wireless communication device to other discovered wireless communication devices via wireless short-range communication; and
   control logic coupled to the memory for changing the operation mode of the wireless communication device to an intermediate mode upon determining that a threshold condition is exceeded.

14. The device of claim 13, wherein short-range communication is at least one of a Bluetooth™ network, a Wireless Local Area Network (WLAN), an Ultra Wide Band Network (UWB), or a Wireless Universal Serial Bus Network (WUSB).

15. The device of claim 13, wherein the presence of an access point is detected via machine-readable information including at least Radio Frequency Identification (RFID).

16. The device of claim 13, which further comprises:
said control logic changing the operation mode of the wireless communication device to a primarily passive mode in response to the detection.

17. The device of claim 16, wherein the primarily passive mode comprises:
decreasing the wireless communication device activity in discovering other wireless short-range communication devices; and
increasing the wireless communication device activity in listening to wireless short-range communication connection attempts.

18. The device of claim 13, which further comprises:
said control logic changing the operation mode of the wireless communication device to a primarily active mode in response to the disconnection.

19. The device of claim 18, wherein the primarily active mode comprises:
increasing the wireless communication device activity in discovering other wireless short-range communication devices; and
decreasing the wireless communication device activity in listening to wireless short-range communication connection attempts.

20. The device of claim 13, wherein the intermediate mode comprises:
balancing the wireless communication device activity relating to discovering other wireless short-range communication devices and listening to wireless short-range communication connection attempts in view of device parameters.

21. The device of claim 20, wherein device parameters include at least one of a battery power level, a use time, a financial measure and a number of connections.

22. The device of claim 13, wherein the receiving and storing of service information occurs only if the information is authorized by the wireless communication device.

23. The device of claim 13, wherein the transmitting of service information occurs only if the information is authorized by the other discovered wireless communication device.

24. The device of claim 13, wherein the threshold level includes at least one of a number of information pushes to other devices, a number of other discovered wireless communication devices, a number of connection requests from other discovered wireless devices, a time period since the wireless communication device was in proximity of the access point and a current battery power level.

25. A computer program product comprising a computer usable medium having computer readable program code embodied in said medium, comprising:
computer readable program code in said medium for detecting the presence of an access point by a wireless communication device;
computer readable program code in said medium for establishing a connection with the access point via wireless short-range communication in order to receive service information;
computer readable program code in said medium for storing the service information in the wireless communication device prior to disconnecting from the access point;
computer readable program code in said medium for transmitting at least part of the service information from the wireless communication device to other discovered wireless communication devices via wireless short-range communication; and
computer readable program code in said medium for changing the operation mode of the wireless communication device to an intermediate mode upon determining that a threshold condition is exceeded.

26. The computer program product of claim 25, wherein short-range communication is at least one of a Bluetooth™ network, a Wireless Local Area Network (WLAN), an Ultra Wide Band Network (UWB), or a Wireless Universal Serial Bus Network (WUSB).

27. The computer program product of claim 25, wherein the presence of an access point is detected via machine-readable information including at least Radio Frequency Identification (REID).

28. The computer program product of claim 25, which further comprises:
computer readable program code in said medium for changing the operation mode of the wireless communication device to a primarily passive mode in response to the detection.

29. The computer program product of claim 28, wherein the primarily passive mode comprises:
decreasing the wireless communication device activity in discovering other wireless short-range communication devices; and
increasing the wireless communication device activity in listening to wireless short-range communication connection attempts.

30. The computer program product of claim 25, which further comprises:
computer readable program code in said medium for changing the operation mode of the wireless communication device to a primarily active mode in response to the disconnection.

31. The computer program product of claim 30, wherein the primarily active mode comprises:
increasing the wireless communication device activity in discovering other wireless short-range communication devices; and
decreasing the wireless communication device activity in listening to wireless short-range communication connection attempts.

32. The computer program product of claim 25, wherein the intermediate mode comprises:
balancing the wireless communication device activity relating to discovering other wireless short-range communication devices and listening to wireless short-range communication connection attempts in view of device parameters.

33. The computer program product of claim 32, wherein device parameters include at least one of a battery power level, a use time, a financial measure and a number of connections.

34. The computer program product of claim 25, wherein the receiving and storing of service information occurs only if the information is authorized by the wireless communication device.

35. The computer program product of claim 25, wherein the transmitting of service information occurs only if the information is authorized by the other discovered wireless communication device.

36. The computer program product of claim 25, wherein the threshold level includes at least one of a number of information pushes to other devices, a number of other discovered wireless communication devices, a number of connection requests from other discovered wireless devices, a time period since the wireless communication device was in proximity of the access point and a current battery power level.

37. A system comprising:
  at least one wireless communication device;
  an access point capable of communicating via short-range wireless communication;
  detecting logic for detecting the presence of an access point by the wireless communication device;
  receiving logic coupled to the detecting logic for establishing a connection with the access point via wireless short-range communication in order to receive service information;
  a memory coupled to the receiving logic for storing the service information in the wireless communication device prior to disconnecting from the access point;
  transmitting logic coupled to the memory for transmitting at least part of the service information from the wireless communication device to other discovered wireless communication devices via wireless short-range communication; and
  control logic coupled to the memory for changing the operation mode of the wireless communication device to an intermediate mode upon determining that a threshold condition is exceeded.

* * * * *

UNITED STATES PATENT AND TRADEMARK OFFICE
CERTIFICATE OF CORRECTION

PATENT NO.         : 7,359,674 B2
APPLICATION NO.    : 11/125273
DATED              : April 15, 2008
INVENTOR(S)        : Markki et al.

It is certified that error appears in the above-identified patent and that said Letters Patent is hereby corrected as shown below:

On the Title Page

INVENTORS, ITEM (75)

Inventor named "Heikki KOKKINENH"

should read -- Heikki KOKKINEN --

Signed and Sealed this

Fifteenth Day of July, 2008

JON W. DUDAS
*Director of the United States Patent and Trademark Office*